United States Patent
Artico

(10) Patent No.: US 10,882,239 B2
(45) Date of Patent: Jan. 5, 2021

(54) EXTRUSION HEAD FOR PIPES

(71) Applicant: Friul Filiere S.P.A., Buja (IT)

(72) Inventor: Valdi Artico, Artegna (IT)

(73) Assignee: FRIUL FILIERE S.P.A., Buja (IT)

( * ) Notice: Subject to any disclaimer, the term of this patent is extended or adjusted under 35 U.S.C. 154(b) by 241 days.

(21) Appl. No.: 16/096,875

(22) PCT Filed: Apr. 28, 2017

(86) PCT No.: PCT/EP2017/060302
§ 371 (c)(1),
(2) Date: Oct. 26, 2018

(87) PCT Pub. No.: WO2017/186961
PCT Pub. Date: Nov. 2, 2017

(65) Prior Publication Data
US 2019/0134874 A1    May 9, 2019

(30) Foreign Application Priority Data

Apr. 28, 2016  (IT) .................. 102016000043667

(51) Int. Cl.
*B29C 48/325*  (2019.01)
*B29C 48/09*   (2019.01)
(Continued)

(52) U.S. Cl.
CPC .......... *B29C 48/325* (2019.02); *B29C 48/09* (2019.02); *B29C 48/2566* (2019.02);
(Continued)

(58) Field of Classification Search
CPC ... B29C 48/325; B29C 48/2566; B29C 48/30; B29C 48/327; B29C 48/25686; B29C 48/09; B29D 23/001
See application file for complete search history.

(56) References Cited

U.S. PATENT DOCUMENTS 2,859,476 A    11/1958  Lainson
4,783,299 A *  11/1988  Prevotat .................. B29C 48/34
                                             264/171.27
(Continued)

FOREIGN PATENT DOCUMENTS

DE    3505837 A1    8/1986
DE    3907866 A1    9/1990
(Continued)

OTHER PUBLICATIONS

Int'l Search Report and Written Opinion dated Aug. 2, 2017 in Int'l Application No. PCT/EP2017/060302.

*Primary Examiner* — Nahida Sultana
(74) *Attorney, Agent, or Firm* — Panitch Schwarze Belisario & Nadel LLP

(57) ABSTRACT

An extrusion head for pipes includes a first female body provided with a first through cavity and a male element inserted and supported in the first cavity, and defining with it a hollow space. A second female body is attached to the first female body and provided with a second through cavity. An interchangeable male body is attached cantilevered on the male element and positioned in the second cavity. The second female body and the interchangeable male body define a passage gap in fluidic communication with the hollow space. In the second cavity, a housing seating is made in which an adjustment ring is positioned, through which the interchangeable male body is positioned through, and adjustment members configured to adjust the position of the adjustment ring.

13 Claims, 4 Drawing Sheets

(51) Int. Cl.
*B29C 48/25* (2019.01)
*B29C 48/30* (2019.01)
*B29D 23/00* (2006.01)

(52) U.S. Cl.
CPC ........ *B29C 48/25686* (2019.02); *B29C 48/30* (2019.02); *B29C 48/327* (2019.02); *B29D 23/001* (2013.01)

(56) References Cited

U.S. PATENT DOCUMENTS

| | | | |
|---|---|---|---|
| 4,946,364 A | 8/1990 | Wagner et al. | |
| 6,050,805 A * | 4/2000 | Lupke | B29C 48/09 425/326.1 |
| 2002/0084542 A1* | 7/2002 | Suzuki | B29C 48/10 264/40.3 |
| 2004/0070105 A1* | 4/2004 | Rasmussen | B29C 48/09 264/171.26 |
| 2006/0125132 A1* | 6/2006 | Irwin | B29C 48/325 264/40.1 |
| 2007/0190201 A1* | 8/2007 | Irwin | B29C 48/10 425/466 |
| 2009/0160083 A1* | 6/2009 | Wallen | B29C 48/705 264/209.8 |
| 2011/0095450 A1* | 4/2011 | Wallen | B29C 48/327 264/176.1 |
| 2012/0187595 A1* | 7/2012 | Ohigawa | B29C 48/337 264/171.26 |
| 2015/0021811 A1* | 1/2015 | Eckhardt | B29C 48/08 264/177.16 |
| 2015/0064302 A1* | 3/2015 | Feuerherm | B29C 48/30 425/466 |
| 2015/0246468 A1* | 9/2015 | Krammer | B65D 35/02 222/566 |

FOREIGN PATENT DOCUMENTS

| | | |
|---|---|---|
| EP | 0950500 A1 | 10/1999 |
| JP | H04276419 A | 10/1992 |

* cited by examiner

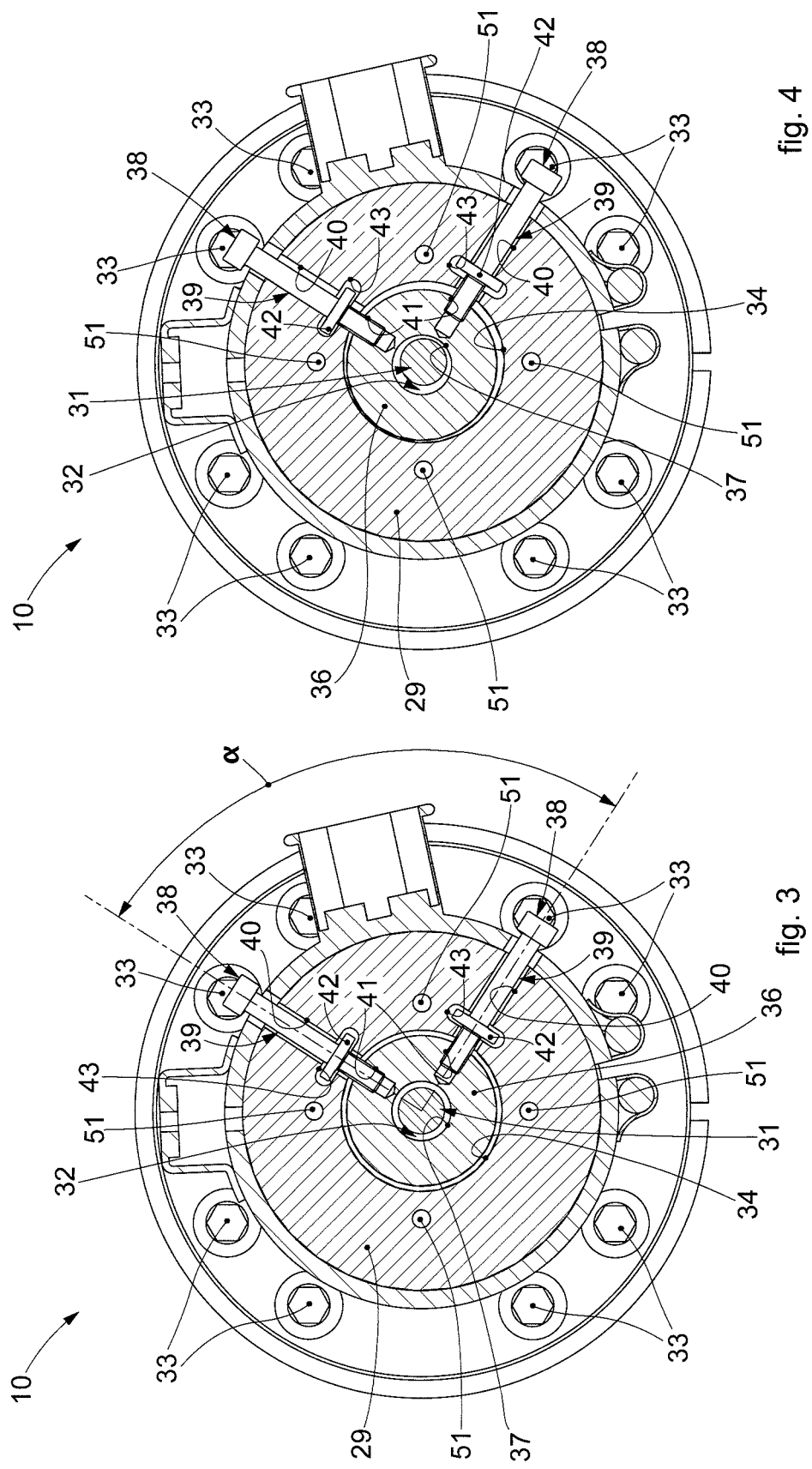

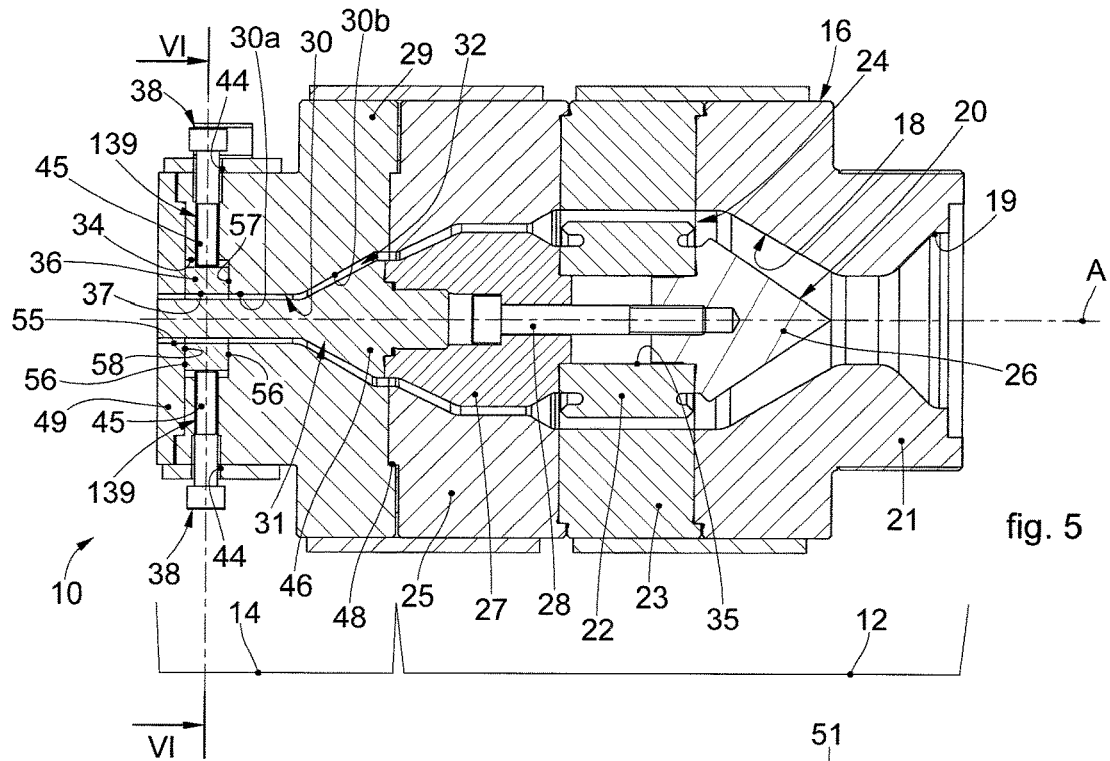
fig. 5
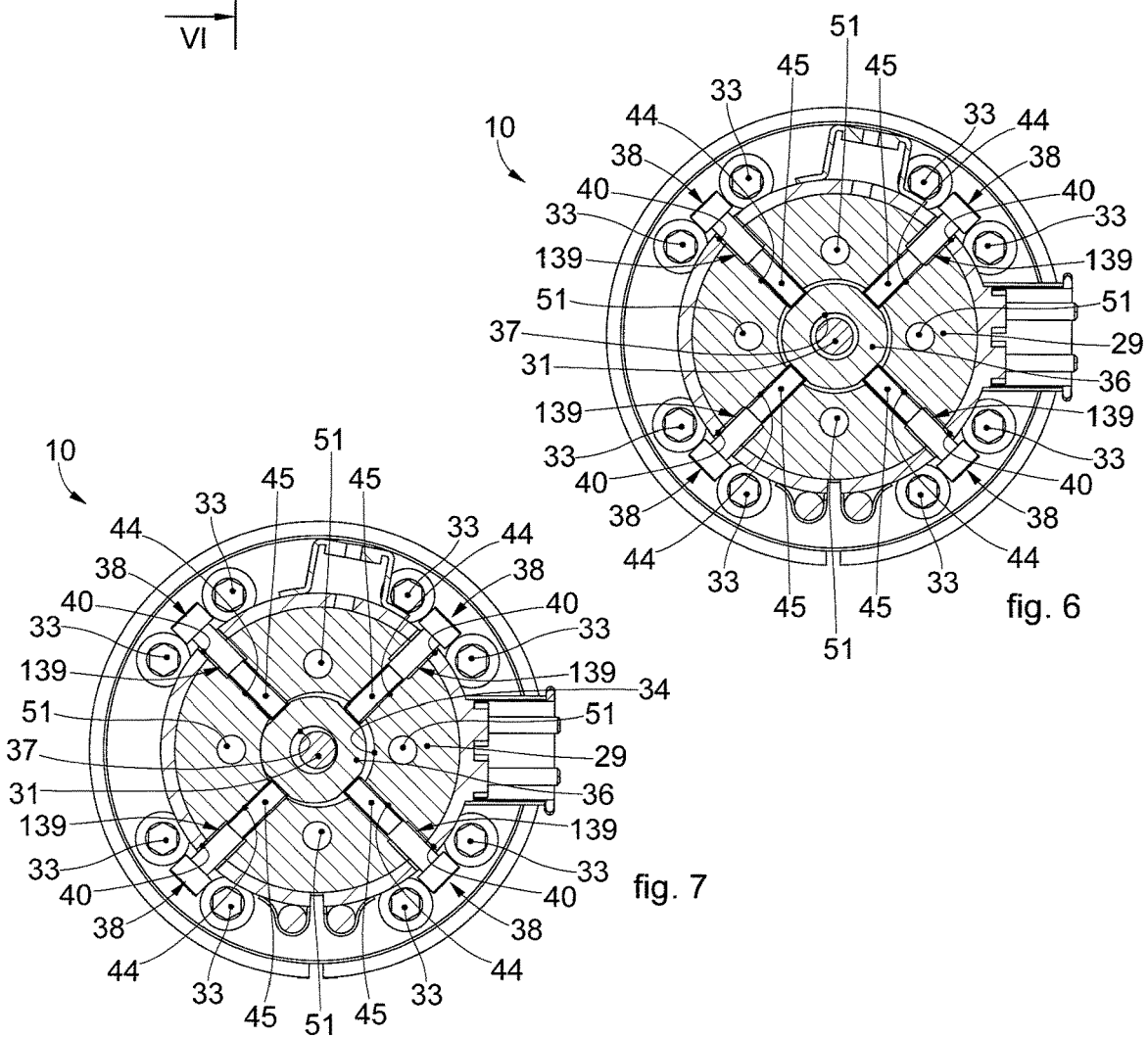
fig. 6
fig. 7

EXTRUSION HEAD FOR PIPES

CROSS-REFERENCE TO RELATED APPLICATIONS

This application is a Section 371 of International Application No. PCT/EP2017/060302, filed Apr. 28, 2017, which was published in the English language on Nov. 2, 2017, under International Publication No. WO 2017/186961 A1, which claims priority under 35 U.S.C. § 119(b) to Italian Application No. 102016000043667, filed Apr. 28, 2016, the disclosures of each of which is incorporated herein by reference.

FIELD OF THE INVENTION

The present invention concerns an extrusion head for pipes, made of one or more polymer materials, for example thermoplastics, such as, merely by way of non-restrictive example, high density polyethylene (HDPE), polyvinylchloride (PVC), polypropylene (PP) and suchlike.

Embodiments of the present invention also concern an extrusion machine that includes the extrusion head for pipes.

The present invention also concerns a method for extruding pipes.

BACKGROUND OF THE INVENTION

Extrusion machines are known, for producing pipes made of polymer material, starting from pellets and/or granules of polymer material.

Such extrusion machines heat the polymer material to its softening temperature and thrust it through an extrusion head in which the pipe is formed.

Examples of forming heads are described in documents JP-A-H04.276419, DE-A-35.05.837, EP-A-0.950.500, DE-A-39.07.866, U.S. Pat. Nos. 2,859,476, and 4,946,364.

The extrusion head mainly comprises a conveyor section, also called conveyor, through which the polymer material is introduced, and a forming section in which the pipe is formed.

The forming section can be selectively replaced, with respect to the conveyor section, so as to install, on the same conveyor section, forming sections which are suitably configured as a function of the specific sizes of the final product to be obtained.

Generally the conveyor section comprises at least a first female body, which can be in a single piece or defined by a plurality of parts.

The first female body is provided with a first cavity that extends through along one axis of the extrusion head.

A male element is positioned coaxially in the first cavity, and together with the first female body defines a hollow space that extends for the whole extension of the first cavity. The male element is supported in suspension in the first cavity by a plurality of connection elements, for example spokes, constrained to the first female body.

The forming section is connected to the conveyor section and comprises a second female body and an interchangeable male body.

The second female body is provided with a second cavity, disposed coaxial with the axis of the extrusion head.

The interchangeable male body is positioned in the second cavity, coaxially with the axis of the extrusion head.

The interchangeable male body is attached cantilevered on the male element.

In this way, the second female body and the interchangeable male body define between them a passage gap, tubular in shape, substantially mating with the pipe to be obtained and through which the polymer material is made to pass.

The second female body is connected to the first female body by connection elements, usually threaded elements, which put respective interface surfaces of the first female body and the second female body into contact under pressure.

The threaded elements are positioned through in the thickness of the second female body and then are screwed into the first female body.

The connection elements between the first and second female bodies ensure that there is no leakage of polymer material between the interface surfaces. For this purpose it is necessary to provide great pressure between the first and second female bodies.

The first and second female bodies are connected to each other so as to dispose the hollow space of the conveyor section in direct communication with the passage gap of the forming section.

It is also known that it is necessary to be able to adjust the passage gap at least when extrusion is started, to allow the homogeneous balancing of the stream of material.

Indeed it is known that if the second cavity of the second female body and the interchangeable male body are not correctly coaxial, this causes different flow speeds of the polymer material locally along the cross section of the passage gap, which means that the pipe is not linear at exit.

To adjust the sizes of the passage gap, the forming section comprises adjustment members configured to adjust the position of the entire second female body with respect to the first female body and with respect to the interchangeable male body.

Acting on the adjustment members therefore allows to modify the position of the second female body and hence allows to obtain the desired adjustment. To allow a sliding movement of the second female body on the first female body, both of them, or at least the second female body, are provided with positioning seatings for the connection elements, which are rather large and suitable to accommodate with play the connection elements.

The action exerted by the adjustment members must be sufficient to overcome the friction forces between the interface surfaces of the first and second female bodies. The friction forces, also given the great clamping pressure exerted by the connection elements, make the adjustment operations particularly complex and imprecise. Furthermore, the adjustment members must be supersized to prevent damage thereto, following the high stresses to which they are subjected during the adjustment operations. The operators are also required to use suitably sized tools, to act effectively on the adjustment members.

It is also known that, because of the phenomena of static and dynamic sliding friction between the interface surfaces, a very imprecise adjustment is obtained.

In fact, with the application of the same force, an excessive displacement of the second female body with respect to the first female body can be caused, which causes an excessive variation of the passage gap and therefore makes another adjustment operation necessary.

One purpose of the present invention is to obtain an extrusion head for pipes which can be regulated quickly, easily and precisely.

Another purpose of the present invention is to obtain an extrusion head for pipes which is simple, economical and easy to replace and maintain.

Another purpose of the present invention is to obtain an extrusion head that can be adjusted using simple tools and with limited adjustment efforts by the operator.

Another purpose is to obtain an extrusion head which allows to make the adjustment operations easy for the operators, that is, to make easily accessible to them the parts on which an operator has to act in order to make the adjustments.

Another purpose is to perfect a method for extruding pipes that is simple, quick and precise.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an extrusion head for pipes comprises:

a first female body provided with a first through cavity, a male element inserted and supported in the first cavity, and defining with the first cavity a hollow space, a second female body attached to the first female body and provided with a second through cavity, an interchangeable male body attached cantilevered on the male element and positioned in the second cavity, the second female body and the interchangeable male body defining between them a passage gap with a tubular shape and located in fluidic communication with the hollow space.

According to one aspect of the present invention, in the second cavity a housing seating is made in which an adjustment ring is positioned, provided with a through hole through which at least part of the interchangeable male body is positioned through.

According to another aspect of the present invention, the through hole and the interchangeable male body define between them a part of the passage gap.

According to one aspect of the present invention, the adjustment ring is held axially in the housing seating by an abutment wall and by a retaining wall opposite the abutment wall.

According to another aspect of the present invention, the extrusion head comprises adjustment members configured to adjust the radial position of the adjustment ring in the housing seating.

Thanks to the adjustment members it is therefore possible to adjust the positioning of the adjustment ring with respect to the interchangeable male body, for example in order to make the through hole of the adjustment ring coaxial with the interchangeable male body. Moreover, the possibility of adjusting the position of the adjustment ring allows to homogenize the speed of flow of the polymer material through the passage gap, in this way avoiding the production of nonlinear pipes at the end of the process.

Furthermore, the axial retention of the adjustment ring between the abutment wall and the retaining wall prevents leakages of polymer material from the interface surfaces of the adjustment ring.

The extrusion head according to the present invention allows to simplify and facilitate the adjustment operations of the flows of polymer material since, unlike known solutions, the adjustment operations of the passage gap in this case are performed by modifying the position of only the adjustment ring and not of the whole second female body, as occurs in the state of the art. Indeed, in this case, the adjustment members act only on the adjustment ring, which is subjected to considerably weaker friction forces compared with known solutions. Thanks to this it is possible to obtain a direct adjustment of the adjustment ring as soon as the adjustment members are activated.

Embodiments of the present invention also concern an extrusion machine that comprises an extrusion head for pipes as described above, and apparatuses to feed, with determinate characteristics, the polymer material to the extrusion head.

The present invention also concerns a method for extruding pipes.

BRIEF DESCRIPTION OF THE DRAWINGS

These and other characteristics of the present invention will become apparent from the following description of some embodiments, given as a non-restrictive example with reference to the attached drawings wherein:

FIG. 3 is a cross section along the section line III-III of FIG. 1 in a first operating position;

FIG. 4 is a cross section along the section line III-III of FIG. 1 in a second operating position;

FIG. 5 is another variant of FIG. 1;

FIG. 6 is a cross section along the section line VI-VI of FIG. 5 in a first operating position;

FIG. 7 is a cross section along the section line VI-VI of FIG. 5 in a second operating position;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
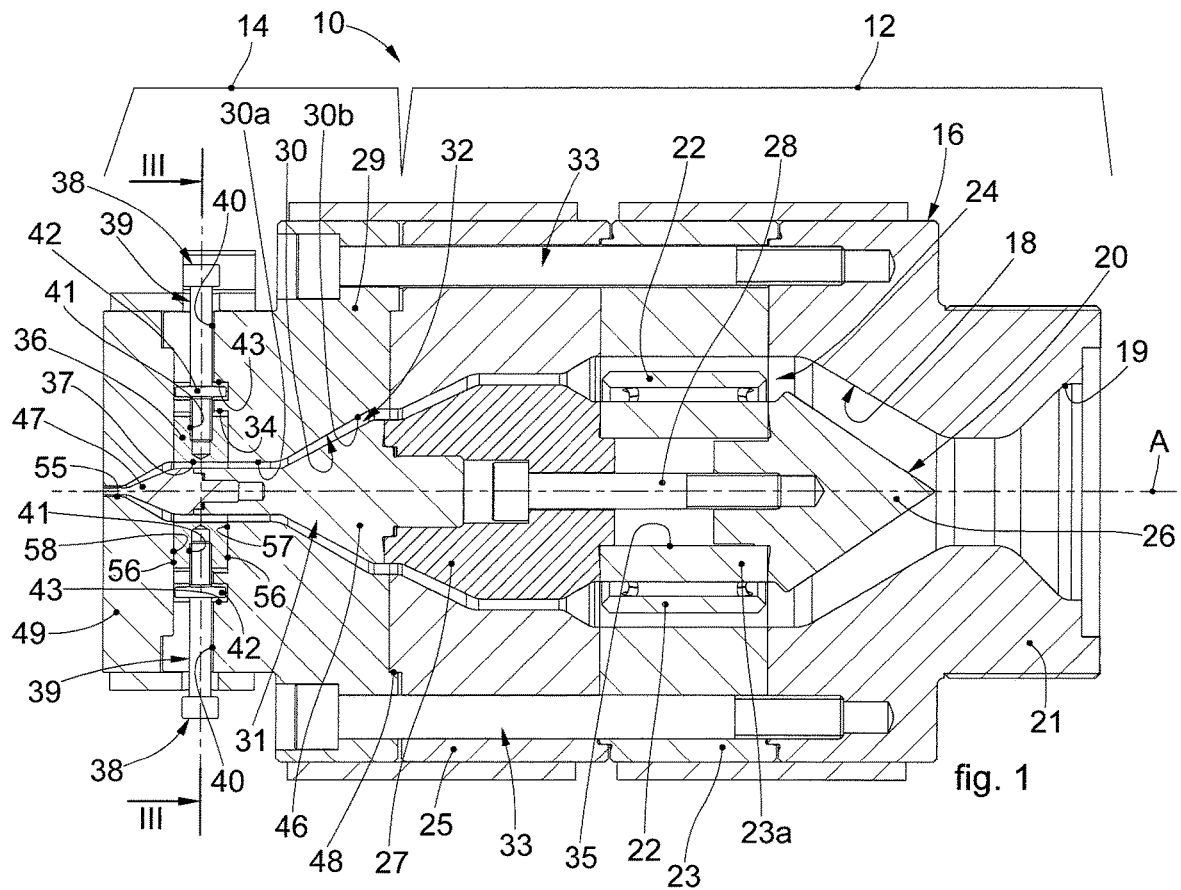
FIG. 1 is a longitudinal section of an extrusion head for pipes, according to the present invention.

With reference to the attached drawings, an extrusion head 10 for pipes according to the present invention comprises a conveyor section 12, into which a polymer material is introduced in fluid form, and a forming section 14, in which the polymer material is formed to define a pipe.

The conveyor section 12 can comprise a first female body 16 provided with a first cavity 18 which extends through along an axis A.

The conveyor section 12 also comprises a male element 20 inserted coaxially and supported in suspension in the first cavity 18, for example by a plurality of connection members 22, such as spokes or threaded elements.

The male element 20 and the first female body 16 define between them at least a hollow space 24 which extends in the first cavity 18.

The first female body 16 and/or the male element 20 can consist of a plurality of components reciprocally connected with each other.

According to the solutions shown in FIGS. 1, 2, 5 and 8, the first female body 16 comprises a first female element 21, or conveyor, a second female element 23, or spider, and a third female element 25, or fixed female element, connected to each other.

The first female element 21, the second female element 23 and the third female element 25 can be provided with respective through apertures together defining the first cavity 18.

The through aperture of the first female element 21 (FIGS. 1, 2, 5 and 8) has an introduction end 19 through which the polymer material is introduced.

The through aperture of the first female element 21 can have a double funnel conformation, that is, it is provided with a narrower section comprised between two flared portions disposed in correspondence with the introduction end 19 and respectively the through aperture of the second female element 23.

The second female element 23 is provided with a tubular portion 23a installed in the respective through aperture of the second female element 23 and attached to the latter by means of the connection members 22, in this case spokes.

The second female element 23 can be made in a single body with the tubular portion 23a and the connection members 22.

The first female element 21, the second female element 23 and the third female element 25 can be reciprocally connected with each other by connection elements 33, for example threaded elements.

Figure 2:
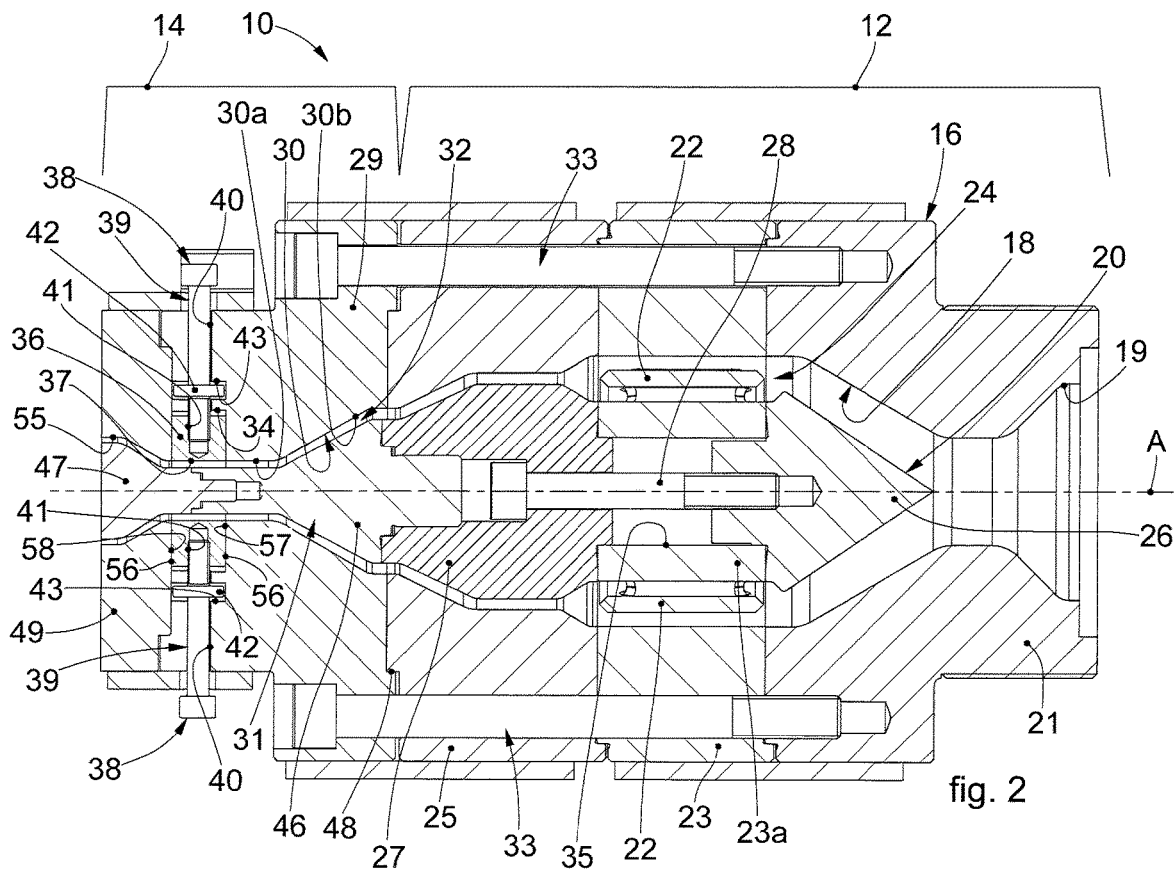
FIG. 2 is a variant of FIG. 1.

According to solutions shown in FIGS. 1, 2 and 5, the male element 20 comprises a tip 26 and a terminal element 27 or fixed male element, reciprocally connected with each other and attached to the tubular portion 23a.

In particular, the tip 26 is positioned in part of the through aperture of the first female element 21, in this case in its divergent portion located innermost to the extrusion head 10.

The tip 26 has a tapered shape toward the introduction end 19 of the polymer material. The particular shape of the tip 26 allows to obtain a homogeneous distribution of the polymer material inside the hollow space 24.

The terminal element 27 is positioned in the through aperture of the third female element 25.

According to the embodiment shown in FIGS. 1, 2 and 5, the tubular portion 23a is provided with a through cavity 35 in which at least part of the tip 26 and the terminal element 27 is installed.

According to one solution, the tip 26 and the terminal element 27 are reciprocally connected by a mechanical connection element 28, installed through between the tip 26, the terminal element 27 and the through cavity 35 of the tubular portion 23a.

The forming section 14 comprises a second female body 29, or interchangeable female element, provided with a second through cavity 30 connected to the first female body 16 of the conveyor section 12, so as to dispose the first cavity 18 and the second cavity 30 continuous with each other.

According to the embodiments in FIGS. 1, 2 and 5, the second female body 29 can be connected to the third female element 25.

The second female body 29 can be removably connected to the first female body 16 by connection elements, for example threaded. The connection elements can be the same connection elements 33 provided to connect the first female element 21, the second female element 23 and the third female element 25.

According to a possible solution, the connection elements 33 are configured to prevent reciprocal movements of the first female body 16 and the second female body 29.

According to another aspect of the present invention, the first female body 16 and the second female body 29 comprise or are provided with radial constraint elements 48, for example abutment portions, reception portions or suchlike, configured to prevent a radial movement of the second female body 29 with respect to the first female body 16. This ensures a correct centering of the first cavity 18 and the second cavity 30.

In this case the connection elements 33 determine a pack-like connection of all the components.

The connection elements 33 also allow to replace at least the second female body 29 with respect to the first female body 16, for example to allow a change-in-format of the pipe obtainable, or for maintenance operations.

The second cavity 30 of the second female body 29 is provided with at least one forming portion 30a, with walls disposed substantially parallel to the axis A of the extrusion head 10 and in which the pipe is formed and defined. The second cavity 30 can be provided with a connection portion 30b, configured to connect the forming portion 30a with the first cavity 18 of the first female body 16.

The forming section 14 comprises an interchangeable male body 31 positioned in the second cavity 30 and defining with the latter a passage gap 32, substantially tubular in shape and in which the pipe is formed.

The passage gap 32 is disposed in fluidic connection with the hollow space 24 of the conveyor section 12.

The interchangeable male body 31 can be attached removably to the male element 20 and is positioned cantilevered with respect to the latter, in the second cavity 30.

The interchangeable male body 31 has shapes and sizes mating with those of the pipe to be obtained, and can be replaced with respect to the male element 20 to adapt to the specific pipe to be extruded.

The interchangeable male body 31 can be positioned coaxial with the axis A of the extrusion head 10.

According to one aspect of the present invention, the second female body 29 is provided with a housing seating 34, made in the second cavity 30, and in which an adjustment ring 36 is disposed, defining with the interchangeable male body 31 a part of the passage gap 32.

According to possible variant embodiments, not shown, the first female body 16 can also be provided with a housing seating, substantially analogous to the housing seating 34 of the second female body 29. In this variant embodiment, the adjustment ring 36 can be positioned partly in the housing seating 34 of the second female body 29 and partly in the housing seating of the first female body 16.

The adjustment ring 36 is provided with a calibration through hole 37 in which at least part of the interchangeable male body 31 is positioned through, and defining with the latter a part of the passage gap 32.

According to a possible solution, the adjustment ring 36 has a substantially cylindrical shape, hollow inside.

According to possible solutions, the adjustment ring 36 is provided with at least two base surfaces 56, opposite, flat and parallel to each other.

According to a possible solution, the adjustment ring 36 is positioned in correspondence with the forming portion 30a. The linear development, parallel to the axis A, of the forming portion 30a allows to have, in this zone, a stream of polymer material which is more stable and hence easily adjustable efficiently.

The housing seating 34 has cross section sizes bigger than those of the adjustment ring 36, thus allowing to adjust the position of the latter with respect to the axis A.

According to a possible solution, shown in FIGS. 1, 2 and 5, the housing seating 34 is made near one end of the second cavity 30 and is open at the front toward the outside, so as to allow to remove and introduce the adjustment ring 36 from/to the housing seating 34.

According to a possible variant embodiment (FIG. 8), the housing seating 34 is made open toward the outside and, during use, at the front toward the first female body 16, in this case toward the third female element 25.

According to a possible solution (FIGS. 1, 2, 5 and 8), the adjustment ring 36 is retained axially in the housing seating 34 by an abutment wall 57 and a retaining wall 58, opposite the abutment wall 57. This condition allows to constrain the adjustment ring 36 axially in the housing seating 34, that is, it prevents axial movements of the adjustment ring along axis A.

In particular, it can be provided that the abutment wall 57 and the retaining wall 58 are positioned in contact, under pressure, against the base surfaces 56 of the adjustment ring 36. It can therefore be provided that the adjustment ring 36 is retained axially pack-wise between the abutment wall 57 and the retaining wall 58. In this way, between the base surfaces 56 of the adjustment ring 36, the abutment wall 57 and the retaining wall 58 no leakages occur of the polymer material in transit in the passage gap 32.

According to a possible solution, the adjustment ring 36 is axially constrained in its movement only by the abutment wall 57 and the retaining wall 58.

The abutment wall 57 and the retaining wall 58 are also provided with respective holes through which the interchangeable male body 31 or the male element 20 are positioned through.

According to possible solutions, shown for example in FIGS. 1, 3 and 5, it can be provided that the second female body 29 is provided with said abutment wall 57, and a retaining element 49 attached to the second female body 29 is provided with said retaining wall 58.

The abutment wall 57, therefore, in this case also defines part of the housing seating 34. According to possible solutions (FIGS. 1, 3 and 5), the retaining element 49, in this case a lid, is configured to retain and constrain the adjustment ring 36 axially in the housing seating 34.

In particular, it can be provided that the retaining element 49 is attached to the second female body 29 by means of connection elements 51, only partly visible in FIGS. 3, 4, 6 and 7.

The retaining element 49 and the connection elements 51 are configured to keep the adjustment ring 36, with its flat walls, pressed under pressure between the housing seating 34 and the retaining element 49. In particular, it can be provided that the retaining element 49, by means of the connection elements 51, closes the adjustment ring 36 pack-wise in the housing seating 34. The connection elements 51 can be inserted through in the thickness of the retaining element 49 and screwed to the second female body 29.

This solution prevents, between the interface surfaces of the adjustment ring 36 with the housing seating 34 and the retaining element 49, any leakage of the polymer material in transit through the passage gap 32. The retaining element 49 is provided with a through cavity 55, located in continuity with the second cavity and through which the pipe is made to pass.

The through cavity 55 of the retaining element 49 has sizes that are at least partly identical to those of the through hole 37 of the adjustment ring 36.

The retaining element 49, or lid, can be configured to substantially close the housing seating 34, leaving open only the passage gap 32 through which the extruded pipe emerges.

Figure 8:
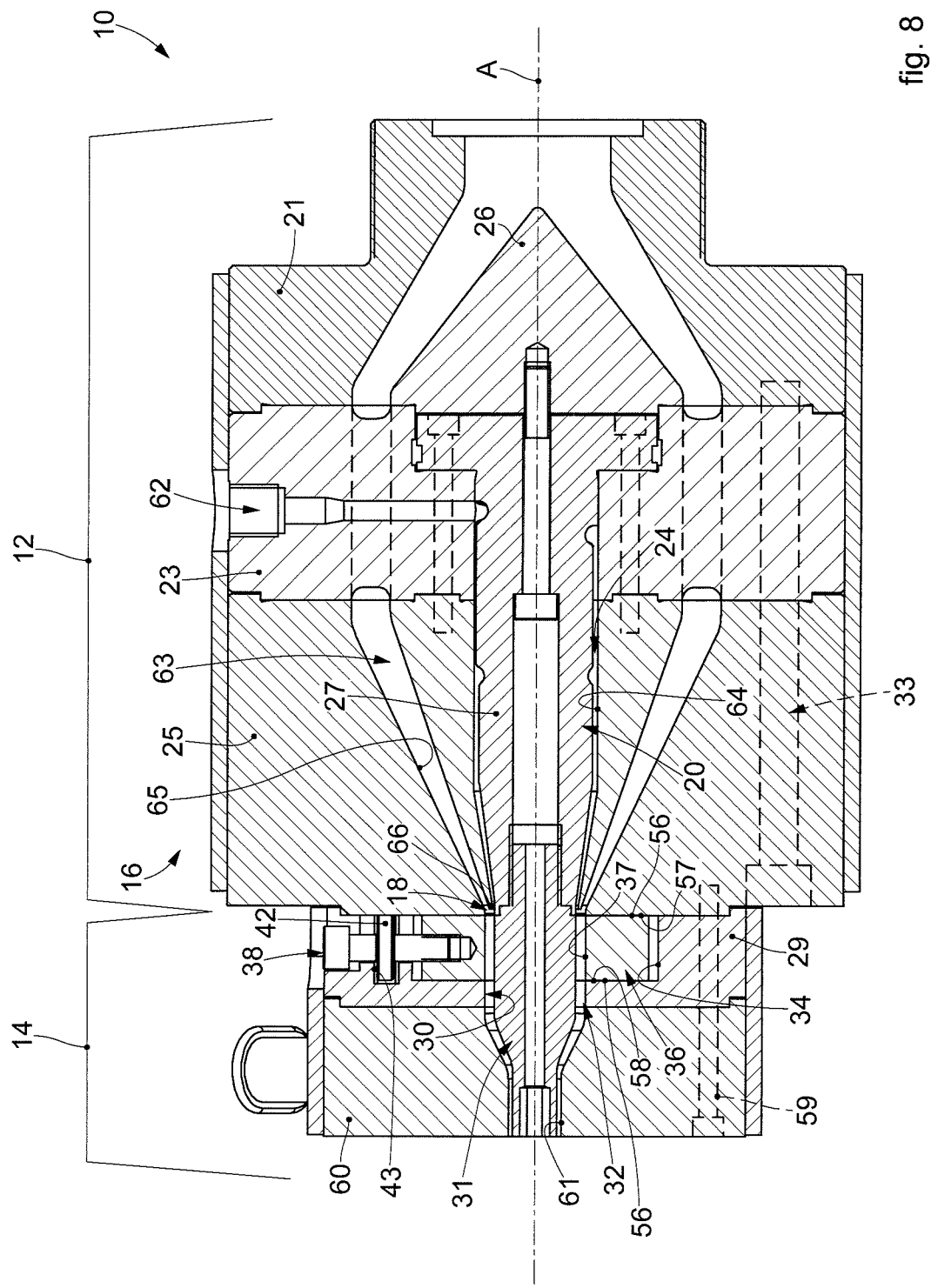
FIG. 8 is a variant of FIG. 1.

According to a variant embodiment, shown in FIG. 8, the first female body 16 is provided with the abutment wall 57 while the second female body 29 is provided with the retaining wall 58. In this case, it can be provided that the housing seating 34 is made open toward the first female body 16.

The retaining wall 58 in this case therefore also defines part of the housing seating 34.

The second female body 29 can be attached to the first female body 16 by attachment elements 59, shown only schematically by lines of dashes in FIG. 8.

The attachment elements 59 constrain the position of the second female body 29 axially and radially with respect to those of the first female body 16.

According to a possible solution (FIG. 8), another female element 60 can be associated with the second female body 29, located on the opposite side to the first female body 16 and also defining said cavity 30 with a through hole 61.

The extrusion head 10 comprises adjustment members 38, configured to adjust the position of the adjustment ring 36 in the housing seating 34, thus adjusting at least the part of the passage gap 32 between the adjustment ring 36 and the interchangeable male body 31.

For example, if it were found that the pipe T were not linear at exit from the extrusion head 10, according to the present invention it is possible to act on at least one adjustment member 38 to move the adjustment ring 36 with respect to the interchangeable male body 31 and obtain a linear pipe T.

The presence of the abutment wall 57 and the retaining wall 58 allows to constrain the adjustment ring 36 in the housing seating 34 only in an axial direction, while movement in a radial direction is allowed, except for possible friction forces.

FIGS. 3 and 4 show two adjustment conditions of the passage gap 32 carried out by the adjustment members 38.

According to some embodiments, the adjustment members 38 are separate and independent elements from the retaining element 49, the connection elements 51 and the attachment elements 59.

According to embodiments shown in FIGS. 1, 2 and 5, the adjustment members 38 comprise threaded elements 39 or 139 inserted in respective housing cavities made in the second female body 29.

According to the solutions in FIGS. 1 and 2, the housing cavities 40 are made open at the front in the second female body 29, that is, toward a lateral wall of the second female body 29, and extend toward the housing seating 34.

According to a possible solution (FIGS. 1, 2 and 5), the housing cavities 40 are made open at the front toward the retaining element 49.

According to a variant embodiment (FIG. 8), the housing cavities 40 are made open at the front toward the first female body 16.

In the embodiment shown in FIGS. 1 and 2, the threaded elements 39 are screwed into threaded holes 41 made in the adjustment ring 36.

In particular, it is provided that the threaded holes 41 are made radially to the radial development of the axis A.

According to the solution shown in FIGS. 1-4, the adjustment members 38 comprise two threaded elements 39 disposed during use angularly distanced by an angle α with an amplitude of 90°.

In particular, the section views in FIGS. 1 and 2 are made from the section according to two section planes located orthogonal to each other and each of which passes through the respective longitudinal axis of the threaded elements 39.

In the same way, the housing cavities 40 and the threaded holes 41 are also made on the second female body 29 and respectively on the adjustment ring 36, angularly distanced by the same angle α.

This position of the threaded elements 39 allows to precisely adjust the position of the adjustment ring 36 in any radial direction whatsoever with respect to the axis A.

Furthermore, the particular disposition of the threaded elements 39 with respect to the extrusion head 10 makes the intervention of the operators easy since, to perform the adjustment operations, they are not obliged to move from one side of the machine to the other to reach the adjustment members 38, as happens for example in the state of the art.

The threaded elements 39 can be provided with an abutment portion 42 configured to define a positioning abutment for the threaded elements 39 in the housing cavity 40.

Each housing cavity 40, in turn, is provided with an abutment part 43 against which the abutment portion 42 of one of the threaded elements 39 is positioned.

The housing cavity 40 can have a shape mating with at least part of the threaded elements 39, and are bigger than them, so as to allow a slight play, for example comprised between 0.5 mm and 3 mm, between the threaded elements 39 and the housing cavity 40.

The operations to install the adjustment ring 36 provide to screw the threaded elements 39 into the threaded holes 41, to insert the adjustment ring 36 with the threaded elements 39 into the housing seating 34 and respectively the housing cavities 40, disposing the abutment portions 42 of the threaded elements 39 into the abutment parts 43 of the housing cavities 40.

Subsequently, it is provided to connect the retaining element 49 to the second female body 29, to constrain the adjustment ring 36 at least axially inside the housing seating 34.

Then, for example during the start of the extrusion process, it is provided to adjust the position of the adjustment ring 36 by screwing and/or unscrewing one or the other of the threaded elements 39.

With reference to FIGS. 5-7, a variant embodiment is shown of the adjustment members 38 of FIGS. 1-4, which comprise a plurality of threaded elements 139.

The threaded elements 139 are installed in the second female body 29 angularly distanced from each other and disposed radially with respect to the axis A.

According to this embodiment, the adjustment members 38 comprise at least three threaded elements 139, in this case four threaded elements 139, advantageously angularly equidistant from each other.

The threaded elements 139 are installed in through holes 44 made in the second female body 29, radially with respect to the axis A, and open in correspondence with the housing seating 34.

Each through hole 44 is provided with at least a threaded part into which one of the threaded elements 139 is screwed.

Each threaded element 139 is provided with a contact terminal 45, disposed protruding from the through hole 44 in the housing seating 34 and which, during use, contacts the adjustment ring 36.

By screwing/unscrewing the threaded elements 139 it is possible to modify the position of the contact terminal 45 in the housing seating 34 and therefore to modify the position of the adjustment ring 36.

FIGS. 6 and 7 show two operating positions of the adjustment ring 36 with respect to the second female body 29, determined by a different way of adjusting the adjustment members 38.

According to a possible embodiment of the present invention (FIG. 5), the interchangeable male body 31 can be made in a single piece.

According to a variant embodiment (FIGS. 1 and 2), the interchangeable male body 31 comprises a main component 46 attached to the male element 20 and an interchangeable component 47 attached to the main component 46, for example by threaded portions.

The interchangeable component 47 can have shapes and sizes substantially mating with those of the tubular cavity of the pipe to be obtained.

At least part of the interchangeable component 47 is disposed during use in part of the through hole 37 of the adjustment ring 36, and partly in the through cavity 55 of the retaining element 49.

Between the interchangeable component 47 and the through cavity 55 of the retaining element 49 a passage gap is defined which is located substantially continuous with the passage gap 32 between the second female body 29 and the interchangeable male body 31.

By replacing only the interchangeable component 47, and possibly the retaining element 49, it is possible to modify the format of the pipe that can be extruded from the extrusion head 10, thus avoiding having to replace all the other components of the extrusion head 10.

Embodiments of the present invention also concern a method for extruding pipes, which provides to introduce polymer material through a hollow space 24 defined between a first cavity 18 of a first female body 16 and a male element 20 inserted and supported in the first cavity 18, and subsequently to make the polymer material transit from the hollow space 24 toward a passage gap 32 of a tubular shape. The passage gap 32 is defined between a second through cavity 30 of a second female body 29 and an interchangeable male body 31 attached cantilevered on the male element 20 and positioned in the second cavity 30.

A housing seating 34 is made in the second cavity 30, in which an adjustment ring 36 is positioned, provided with a through hole 37. At least part of the interchangeable male body 31 is positioned in the through hole 37, and the through hole 37 and the interchangeable male body 31 define between them at least a part of the passage gap 32.

The method for extruding pipes comprises a step of adjusting the part of the passage gap 32, adjusting, by means of adjustment members 38, the position of the adjustment ring 36 in the housing seating 34 made in the second cavity 30.

It is clear that modifications and/or additions of parts and/or steps may be made to the extrusion head 10 for pipes, the extrusion machine and the method for extruding pipes as described heretofore, without departing from the field and scope of the present invention.

For example, embodiments of the present invention can provide that the extrusion head is configured to extrude pipes with a circular, polygonal and/or mixed curved and polygonal cross section shapes.

Furthermore, in other embodiments, the housing seating 34 made in the second female body 29 can be made in the second cavity 30, in any axial position whatsoever of the axis A, for example in correspondence with the connection portion 30b and/or open at the front toward the conveyor section 12.

It is also clear that, although the present invention has been described with reference to some specific examples, a person of skill in the art shall certainly be able to achieve many other equivalent forms of extrusion head 10 for pipes, the extrusion machine and the method for extruding pipes, having the characteristics as set forth in the claims and hence all coming within the field of protection defined thereby.

Merely by way of example, FIG. 8 shows an extrusion head 10 for coextruded pipes, that is, pipes defined by a first layer and at least a second layer, overlapping and coaxial with each other.

In this case, the conveyor section 12 is provided with at least two feed lines to feed the material, which converge together toward a single hollow space 24 where the coextruded pipe is formed.

In particular, with reference to FIG. 8, it can be provided that the first female body 16 is provided with a first feed line 62 into which a first polymer material is inserted, and at least a second feed line 63 located partly coaxial with and outside the first feed line 62 and into which a second polymer material is inserted.

Both the first feed line 62 and the second feed line 63 are provided with at least a first annular channel 64 and respectively a second annular channel 65, located coaxial with each other.

The first annular channel 64 and the second annular channel 65 converge together in a common meeting zone 66 of the first cavity 18 defined by the first female body 16.

The present invention can be used in extrusion heads for pipes with more than two layers.

The invention claimed is:

1. An extrusion head for manufacturing pipes, comprising:
   a first female body (16) provided with a first through cavity (18),
   a male element (20) inserted and supported in the first cavity (18), and defining with said first cavity (18) a hollow space (24),
   a second female body (29) attached to said first female body (16) and provided with a second through cavity (30),
   an interchangeable male body (31) attached cantilevered on said male element (20) and positioned in the second cavity (30), said second female body (29) and said interchangeable male body (31) defining between them a passage gap (32) with a tubular shape and located in fluidic communication with said hollow space (24),
   wherein:
   in said second cavity (30) a housing seating (34) is made in which an adjustment ring (36) is positioned, provided with a through hole (37) through which at least part of said interchangeable male body (31) is positioned through,
   said through hole (37) and said interchangeable male body (31) define between them a part of said passage gap (32),
   said adjustment ring (36) is retained axially in said housing seating (34) by an abutment wall (57) and by a retaining wall (58) opposite said abutment wall (57), and
   said adjustment ring (36) comprises adjustment members (38) configured to adjust a radial position of said adjustment ring (36) in said housing seating (34).

2. The extrusion head as in claim 1, wherein said abutment wall (57) and said retaining wall (58) are positioned in contact, under pressure, against flat and opposite base surfaces (56) of said adjustment ring (36).

3. The extrusion head as in claim 1, wherein said housing seating (34) is made in proximity to an end of said second cavity (30), it is open at the front toward the outside to allow the removal and the introduction of said adjustment ring (36) from and into said housing seating (34).

4. The extrusion head as in claim 1, wherein said second female body (29) is provided with said abutment wall (57), and a retaining element (49), attached to said second female body (29), is provided with said retaining wall (58).

5. The extrusion head as in claim 1, wherein said first female body (16) is provided with said abutment wall (57) and said second female body (29) is provided with said retaining wall (58), said second female body (29) being attached to said first female body (16) with attachment elements (59).

6. The extrusion head as in claim 1, wherein said adjustment members (38) comprise threaded elements (39; 139) inserted in housing cavities (40) made in said second female body (29).

7. The extrusion head as in claim 6, wherein said housing cavities (40) are made open at the front in said second female body (29), and extend toward said housing seating (34), and wherein said threaded elements (39) are screwed into threaded holes (41) made in said adjustment ring (36).

8. The extrusion head as in claim 7, wherein said adjustment members (38) comprise two threaded elements (39) disposed angularly distanced by an angle (a) with an amplitude of 90°, and wherein said housing cavities (40) and said threaded holes (41) are made in said second female body (29) and respectively in said adjustment ring (36) angularly distanced by said angle (a).

9. The extrusion head as in claim 6, wherein said threaded elements (39) are provided with an abutment portion (42) configured to define a positioning abutment for said threaded element (39) in said housing cavity (40), and wherein each of said housing cavities (40) is provided with an abutment part (43) against which said abutment portion (42) of one of said threaded elements (39) is positioned.

10. The extrusion head as in claim 6, wherein said adjustment members (38) comprise at least three threaded elements (139), installed in through holes (44) made in said second female body (29), and open in correspondence with said housing seating (34), each of said through holes (44) being provided with at least one threaded part into which one of said threaded elements (139) is screwed, and each of said threaded elements (139) being provided with a contact terminal (45) disposed protruding from said respective through hole (44) in said housing seating (34), said contact terminal (45) contacting said adjustment ring (36) during use.

11. The extrusion head as in claim 1, wherein said second female body (29) is removably connected to said first female (16) body by means of connection elements (33) configured to prevent reciprocal movements between said first female body (16) and said second female body (29).

12. An extrusion machine for pipes comprising at least one extrusion head (10) as in claim 1.

13. An extrusion method for manufacturing pipes that provides to introduce polymer material through a hollow space (24) defined between a first cavity (18) of a first female body (16) and a male element (20) inserted and supported in the first cavity (18), and subsequently to make said polymer material transit from said hollow space (24) toward a passage gap (32) of a tubular shape and defined between a second through cavity (30) of a second female body (29) and an interchangeable male body (31) attached cantilevered on said male element (20) and positioned in the second cavity (30), the method comprising a step of adjusting at least a part of said passage gap (32) that provides to adjust, by means of adjustment members (38), a radial position of an adjustment ring (36) positioned in a housing seating (34) made in said second cavity (30), at least part of said interchangeable male body (31) being positioned through a through hole (37) of said adjustment ring (36), and said through hole (37) and said interchangeable male body (31) defining between them said part of said passage gap (32), said adjustment ring (36) being retained axially in said housing seating (34) by an abutment wall (57) and by a retaining wall (58) opposite said abutment wall (57).

* * * * *